US008005202B2

(12) United States Patent  
Agapi et al.

(10) Patent No.: US 8,005,202 B2
(45) Date of Patent: Aug. 23, 2011

(54) AUTOMATIC GENERATION OF A CALLFLOW STATISTICS APPLICATION FOR SPEECH SYSTEMS

(75) Inventors: Ciprian Agapi, Lake Worth, FL (US); James R. Lewis, Delray Beach, FL (US); Michael H. Mirt, Deerfield Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1600 days.

(21) Appl. No.: 11/297,537

(22) Filed: Dec. 8, 2005

(65) Prior Publication Data

US 2007/0133777 A1  Jun. 14, 2007

(51) Int. Cl.
   *H04M 3/42* (2006.01)
(52) U.S. Cl. .................. 379/201.03; 379/88.18
(58) Field of Classification Search .. 379/265.01–266.1, 379/88.01–88.28, 9.04, 29.01
   See application file for complete search history.

(56) References Cited

U.S. PATENT DOCUMENTS

| | | | |
|---|---|---|---|
| 5,724,406 A * | 3/1998 | Juster | 379/88.13 |
| 6,483,911 B1 * | 11/2002 | Capriotti | 379/201.03 |
| 6,487,277 B2 * | 11/2002 | Beyda et al. | 379/88.01 |
| 6,694,001 B1 | 2/2004 | Lampell et al. | |
| 6,763,104 B1 * | 7/2004 | Judkins et al. | 379/265.09 |
| 6,823,054 B1 * | 11/2004 | Suhm et al. | 379/134 |
| 7,203,285 B2 * | 4/2007 | Blair | 379/32.01 |
| 7,295,577 B2 * | 11/2007 | Moody et al. | 370/496 |
| 7,769,147 B1 * | 8/2010 | Young et al. | 379/88.18 |
| 7,881,440 B2 * | 2/2011 | Castillo et al. | 379/29.1 |
| 2002/0067821 A1 * | 6/2002 | Benson et al. | 379/265.02 |
| 2005/0010411 A1 | 1/2005 | Rigazio et al. | |
| 2006/0147020 A1 * | 7/2006 | Castillo et al. | 379/220.01 |
| 2007/0106515 A1 * | 5/2007 | Wong | 704/270 |

OTHER PUBLICATIONS

Chelston Call Systems, Interactive Voice Response Script Builder Tool, May 22, 2002, 1-2.*

* cited by examiner

*Primary Examiner* — Fan Tsang
*Assistant Examiner* — Assad Mohammed
(74) *Attorney, Agent, or Firm* — Steven M. Greenberg, Esq.; Carey, Rodriguez, Greenberg & Paul

(57) ABSTRACT

A method, system and computer program for automatically generating call flow statistics in a voice application. Embodiments of the present invention address deficiencies of the art in respect to call flow statistics generation systems and provide a novel and non-obvious method, system and computer program product for automatically generating a call flow statistics-generating application and presenting updated statistics on a call flow representation. Various statistics collection points are identified on the visual representation. Upon running of the voice application, call flow statistics are gathered and presented for each statistics collection point. Call identifiers corresponding to each call path can be selected and call paths corresponding to the selected call identifier may be highlighted and their call statistics displayed.

20 Claims, 6 Drawing Sheets

AUTOMATIC GENERATION OF A CALLFLOW STATISTICS APPLICATION FOR SPEECH SYSTEMS

BACKGROUND OF THE INVENTION

1. Field of the Invention

The present invention relates to the field of interactive voice response systems and more particularly to a system and method that automatically generates a statistics-gathering application for collecting callback statistics for the voice application thus eliminating the expense and effort of generating a separate statistics subsystem.

2. Description of the Related Art

Statistics gathering is a feature that is desired in most interactive voice applications. These statistics provide useful information that allows the voice application developer to improve upon such features as prompts, help content, grammars, and the overall call flow process. The voice application developer may also use statistics to verify overall system effectiveness and to provide a mechanism to alert the customer that selected call path usage has reached a threshold.

However, current statistic-gathering methods require considerable time, effort, and expense to design, develop, implement and verify. Present statistics-gathering methods must be developed manually by voice application developers, or their subcontractors, and are often considered expensive and a mere afterthought, thus leading to inefficient or ineffective call flow designs. Further, current methods provide a separate statistics-gathering module that is implemented only after the call flow application has been designed. Thus, useful statistical information is not used in the development and revision of the call flow program.

It would be useful to develop an automated, configurable call flow statistics gathering system that would allow the call flow application developer to view and use call flow statistics during the development of the interactive voice application. Such a system can be used to verify the voice application, and aid in System Verification Test and other production environments. Finally, an automated statistics gathering system would eliminate the time and effort associated with the manual development of separate statistics-collection systems, and define a statistics package that can verify its accuracy at every possible call flow path.

BRIEF SUMMARY OF THE INVENTION

Embodiments of the present invention address deficiencies of the art with respect to automated statistics-collection in interactive voice applications and provide a novel and non-obvious method, system and computer program product for automatically collecting call flow statistics at any point in the call flow process. In this regard, a solution for automatically generating and displaying call flow statistics after the deployment of the voice application is provided. The solution provides an automated method for gathering, calculating and displaying call flow percentages and other valuable call flow information at various statistics collection points in the call flow.

In one embodiment, a method for automatically generating call flow statistics for a voice application is provided. The method includes providing a call flow of the voice application, where the call flow includes one or more call flow paths, identifying one or more statistics collection points within the call flow, and upon deployment of the voice application, generating call flow statistics for one or more statistics collection points.

In another embodiment, a system for automatically generating call flow statistics for a voice application is provided. The system includes a display for providing a visual representation of a call flow of the voice application, where the call flow includes one or more call flow paths. The system also includes a processor coupled to the display, where the processor is programmed to identify one or more statistics collection points within the call flow, upon deployment of the voice application, generate call flow statistics for one or more statistics collection points.

In yet another embodiment, a computer program product comprising a computer usable medium having computer usable program code for automatically generating call flow statistics for a voice application is provided. The computer program product includes computer usable program code for providing a call flow of the voice application, where the call flow includes one or more call flow paths, computer usable program code for identifying one or more statistics collection points within the call flow, and computer usable program code for, upon deployment of the voice application, generating call flow statistics for one or more statistics collection points.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automatic generation and gathering of call flow statistics at any point during development of a call flow builder application. In accordance with an embodiment of the present invention, a call flow statistics gathering system is provided that presents a visual representation of a call flow for a particular voice application, where the visual representation illustrates one or more call flow paths. Various statistics collection points are identified on the visual representation. Upon running of the voice application, call flow statistics incorporating the number and type of system prompts, caller responses, selected grammars, and/or selected call paths, are gathered and presented for each statistics collection point. Statistics can also be obtained for one or more specific call paths or statistics collection points.

Figure 1:
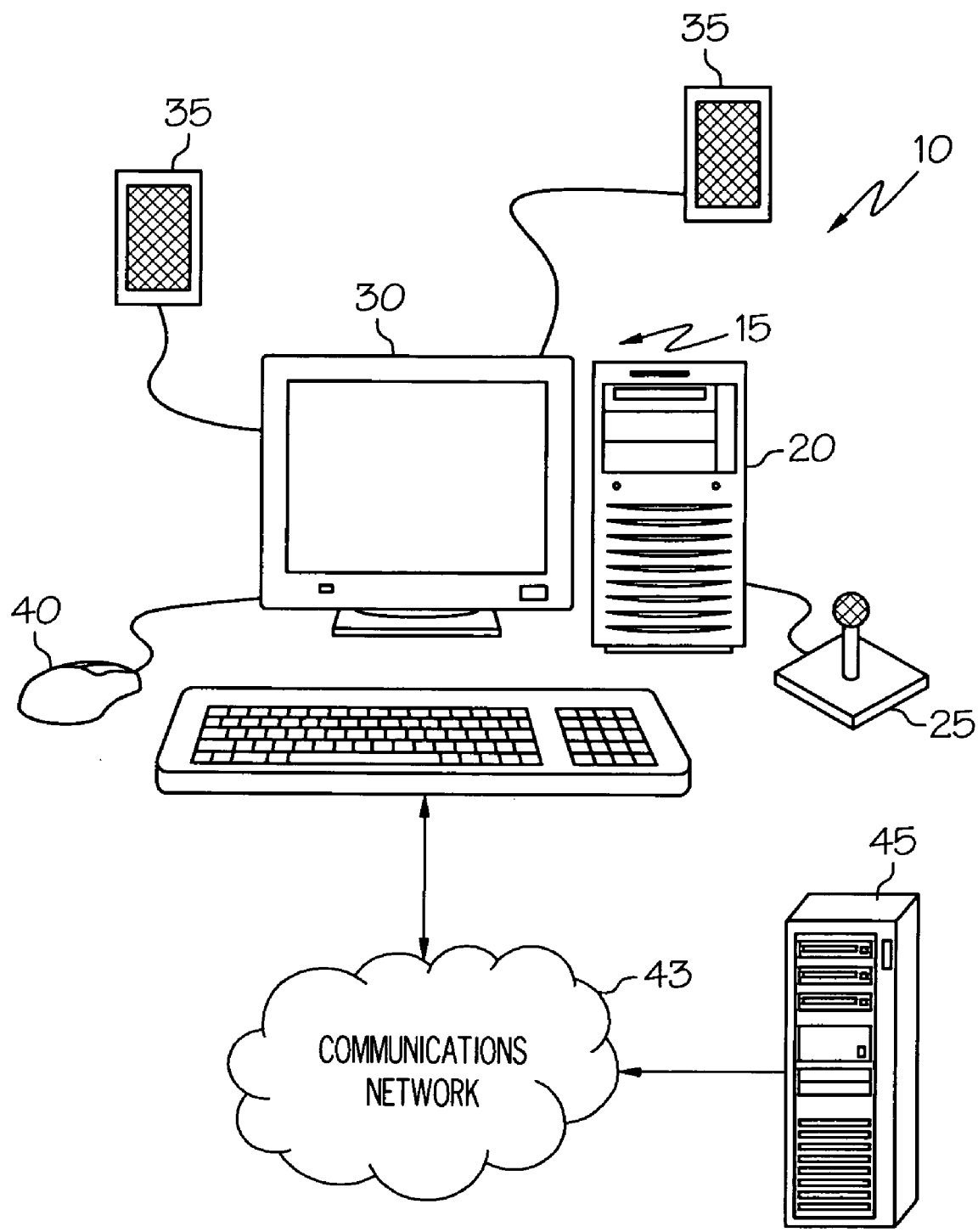
FIG. 1 is an illustration of a computer system for a speech recognition system incorporating the method and system of the present invention.

In further illustration, FIG. 1 shows a typical computer system 10 used with voice applications in conjunction with the present invention. The system is preferably comprised of a computer 15 including a database and a central processing unit (CPU) 20, one or more memory devices, and associated circuitry. The system may also include a microphone 25 operatively connected to the computer system through suitable interface circuitry or a "sound board" (not shown), and at least one user interface display unit 30 such as a video data terminal (VDT) operatively connected thereto. The CPU can be comprised of any suitable microprocessor or other electronic processing unit, as is well known to those skilled in the art. Speakers 35 as well as an interface device, such as mouse 40 can also be provided with the system, but are not necessary for operation of the invention as described herein. In an alternate embodiment, a server 45 may be in data communication with computer system 10, via communications network 43, whereby server 45 stores the call flow statistics.

Figure 2:
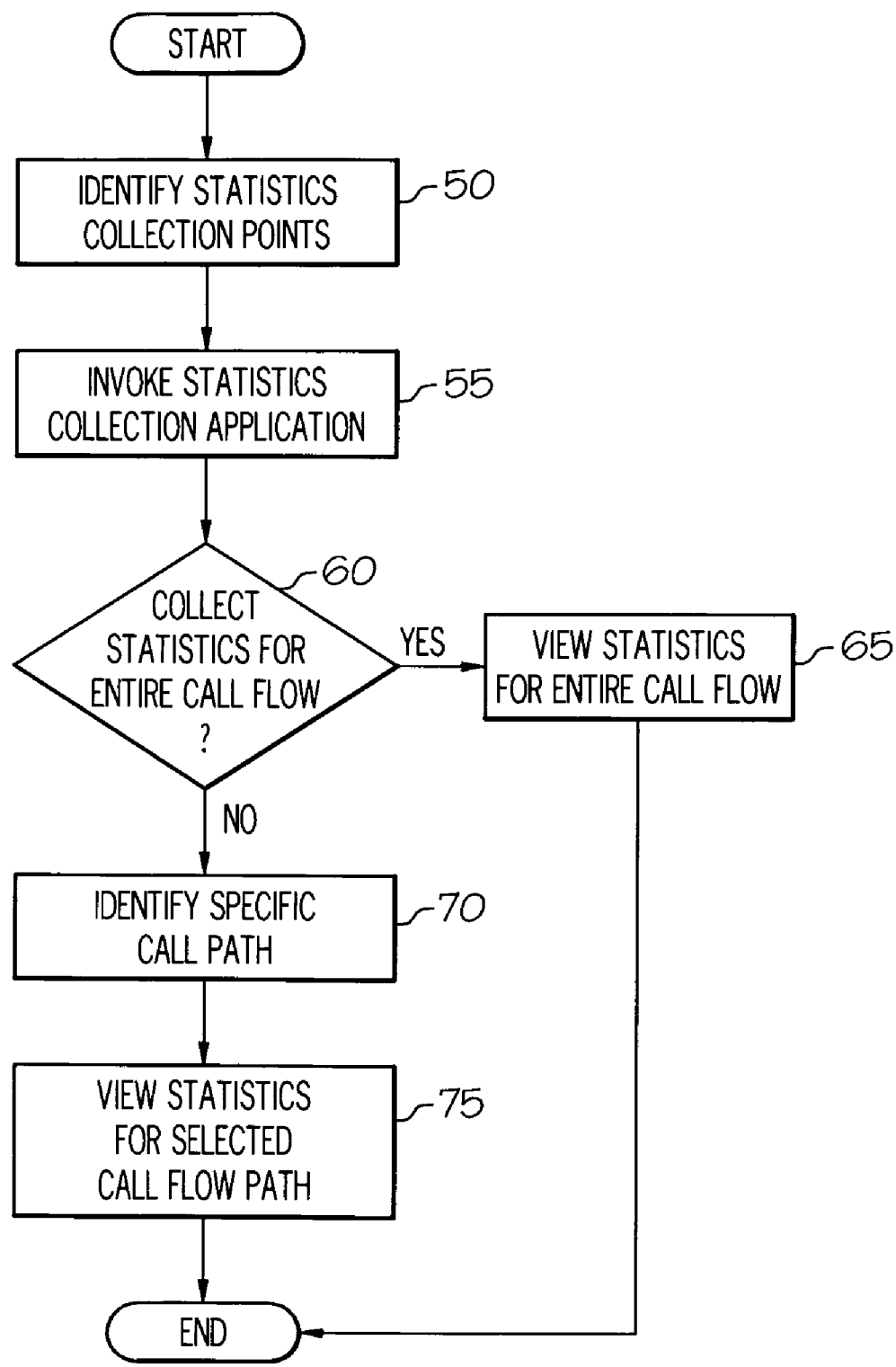
FIG. 2 is a flowchart illustrating the steps taken by the method of the present invention.

FIG. 2 is a flow chart illustrating the steps taken by an embodiment of the present invention. A call flow is presented and one or more statistics collection points are identified, at step 50. A statistics collection point may be defined as a node in the call flow where a caller-system interaction occurs. This could be, for example, when a caller is prompted, when the caller replies, when a grammar is activated, when an annotation is resolved or when a specific call path is taken. Upon activation by the user, a statistics gathering application is invoked, at step 55. The user then decides whether he or she wishes to view statistical information about the entire call flow or just for a specified call path, at step 60. If the former, the user can take an action (for example, clicking the mouse pointer anywhere on the call flow canvas) at step 65 and view call flow statistics for the entire call flow. If call statistics for a specific call path is desired, the user identifies a specific call path (perhaps by clicking on the actual call path depicted in the call flow diagram) at step 70 and views the call statistics for the selected call path, at step 75.

Figure 3:
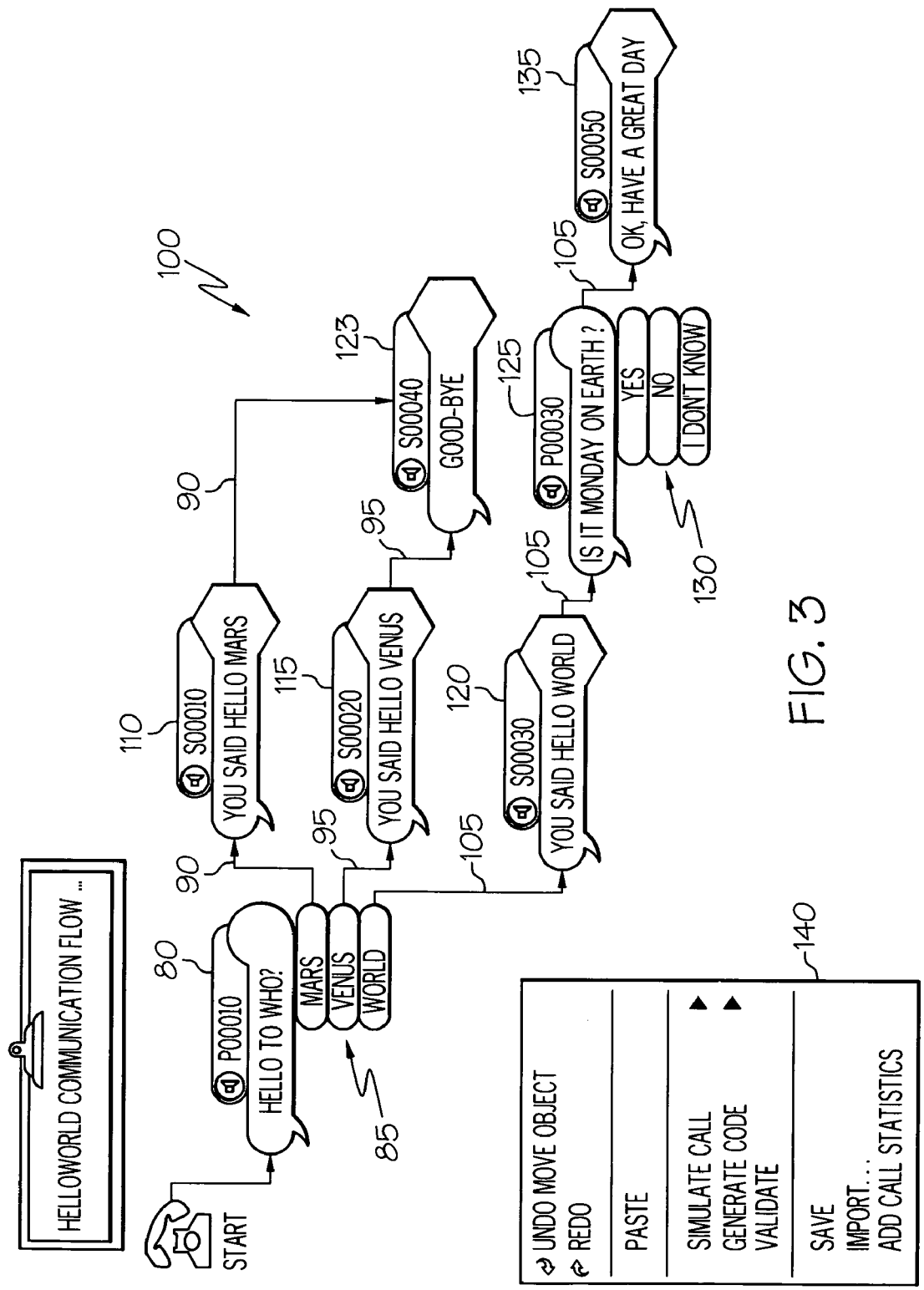
FIG. 3 is a schematic illustration of a call flow for a voice application incorporating features of the present invention.

FIG. 3 is a schematic diagram of a call flow 100 for a voice application in accordance with the present invention. A call flow is a specification representing how users or callers interact with the voice application when they talk to it. As used herein, a "voice application" shall mean any logic permitting user interaction through a voice driven user interface, such as a mark-up language specification for voice interaction with some form of coupled computing logic. One example of a voice application is an application written in Voice Extensible Mark-up Language, or "VoiceXML." However, it is readily understood that VoiceXML applications are not the only type of voice applications, and any reference to the term "VoiceXML application" herein shall encompass all voice applications.

In typical voice application systems, the system receives input from the caller, and can record the input with an audio device, or convert the spoken word input into text using an automatic speech recognition engine. The voice application can then playback the recorded audio to the caller as a prompt, or may convert a text stream to audio using the text-to-speech capabilities of a speech technologies platform. Because different prompts lead to different caller responses, each of which can lead to different selected grammars and further prompts, it is important to maintain statistical records of each response, each prompt, and each selected grammar, since these records may be useful to the developer in creating the call flow development application.

The present invention may be used with any call flow builder application, such as, but not limited to, Callflow Builder™ by IBM Corporation. Call flow 100, as shown in FIG. 3, is an exemplary graphical call flow diagram illustrating various nodes and call flow paths. Nodes may indicate system prompts, caller response choices, and responsive text or grammars used in the voice application. Depending upon the caller response to a given prompt, different call paths are created, as indicated by the arrows between nodes. In the example provided, the caller, in responding to a first prompt 80 (P00010), is presented with three possible caller response choices. Of course, call flow applications can provide any number of prompts and caller responses and the invention is not limited in this fashion.

First prompt 80 (P00010) prompts the caller to identify the party they wish to speak with. In the illustrative example of a "Hello World" voice application, the caller provides a response 85, identifying either "Mars", "Venus", or "World". Depending upon the caller response, a different call path is taken. If the caller responds to prompt 80 by uttering "Mars", call path 90 is taken, if the response is "Venus", call path 95 is taken, and if the response is "World", call path 105 is taken. Call path 90 continues to node 110 (S00010), call path 95 continues to node 115 (S00020), and call path 105 continues to node 120 (S00030). Nodes 110, 115 and 120 provide different system responses depending upon the caller response, in this case, affirming the caller's selection (i.e., "You said hello Mars", "You said hello Venus", or "You said hello world").

If the caller identifies either "Mars" or "Venus", the call terminates at node 123 (S00040) with a "Goodbye!" system reply. However, if the call is to "World", a second prompt 125 (P00030) is supplied. Prompt 125 supplies the question "Is it Monday on Earth?" Again, three caller response selections 130 are provided. The call path through prompt 125 (call path 105) terminates at node 135 (S00050) with a system reply "OK, have a great day".

Thus, FIG. 3 illustrates a typical call flow diagram with several call flow paths, nodes, system responses and prompts. A voice application developer may desire to obtain and view call flow statistics after deployment of the voice application. The present invention creates a separate statistics-gathering application that records the various prompts, caller selections, and obtained grammars upon deployment of the voice application. Thus, call flow 100 can provide an "Add Call Statistics" selection from a drop down menu 140, which is depicted on the call flow canvas upon action taken by the user, i.e. a right-click of a mouse.

In the example shown in FIG. 3, right-clicking a mouse will bring up menu 140, and call flow statistics for the latest voice application utilizing call flow 100 will be provided. Right-clicking on a specific call flow path would provide call flow statistics for only the selected call flow path. The menu is only an exemplary embodiment of a way to invoke the statistics-gathering application, and it is within the scope of the invention to allow the developer to invoke the statistics collection program in a variety of textual or graphical ways.

Figure 4:
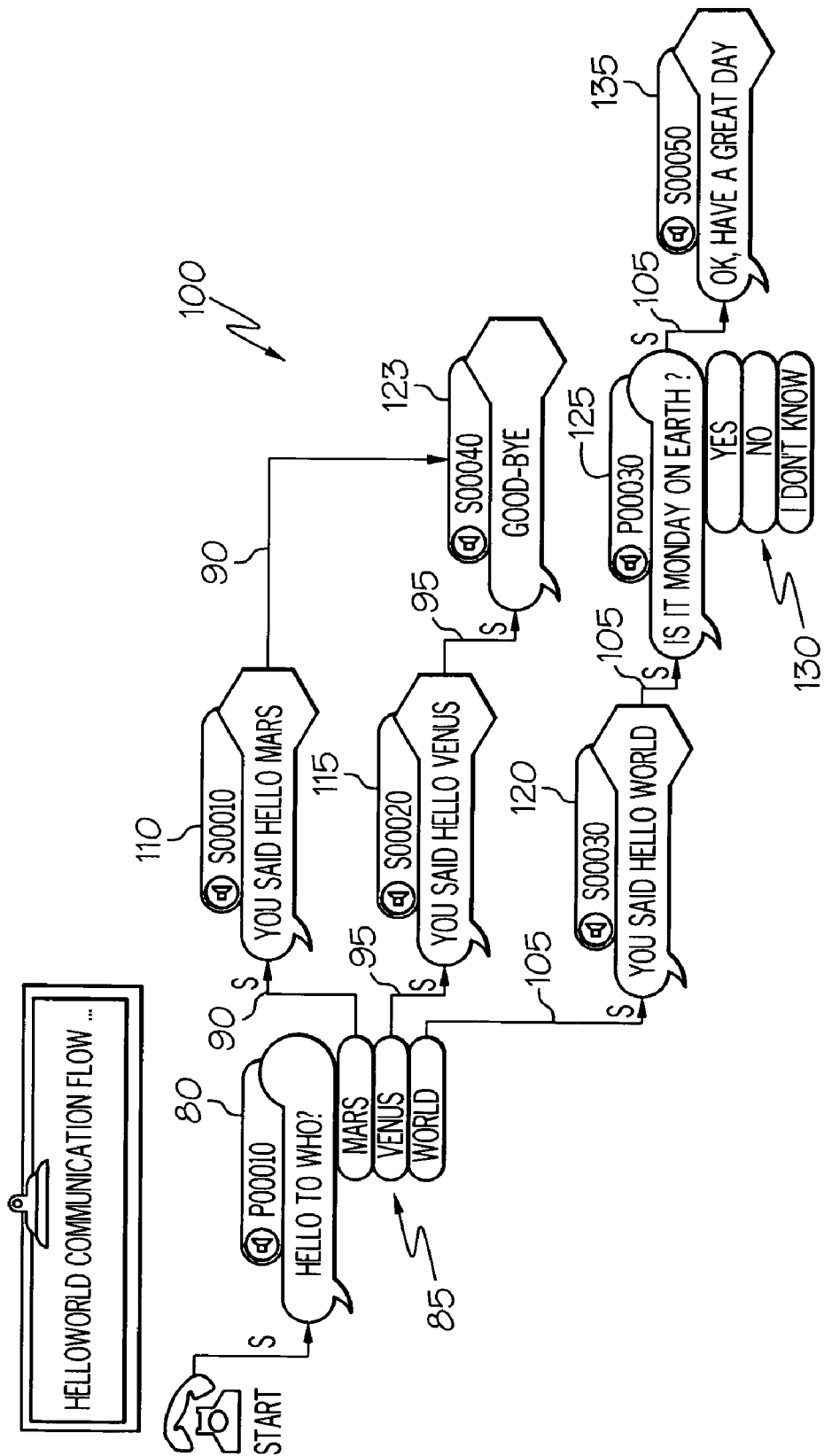
FIG. 4 is a schematic illustration of a call flow for a voice application including visible indication of statistics collection points.

Nodes where statistics may be gathered are identified as Statistics Collection Points ("SCPs"). In FIG. 4, the system of the present invention may provide visual confirmation that call flow statistics have been gathered at each SCP in call flow 100. In this example, after the developer has activated the statistics-gathering application, an "S" appears at each SCP, indicating that call statistics have been generated for that SCP, based upon the most recent activation of the voice application. At this time, although it is known that call statistics have been gathered, the actual statistics have not yet been displayed.

Once the statistics have been collected on either a remote or a local server, a call flow development program attaches the collected statistics, which are presented in call flow 100 with percentage calculations for each SCP. For example, instead of displaying an identifier that notifies the user that statistics have been calculated, call flow 100 can display the actual call flow percentages at each SCP. Using the example shown in FIGS. 3 and 4, three calls were processed. In one call, the caller selected "Mars" as the party they wanted to speak with. An affirmative grammar was played (at node 110) via call path 90, ultimately resulting in a system response at node 123. In similar fashion, another call requested "Venus" and was thus taken along call path 95 to nodes 115 and 123. The third caller responded with "World" and was taken to node 120 via call path 105, where a second prompt was played at node 125 (P00030)

Because three incoming calls were directed to three separate call paths, each node 110, 115 and 120 received one-third or 33.3% of the incoming calls. These percentage values can be displayed at their respective nodes. Because, two of the three calls traveled call paths (90 and 95) that terminated at node 123, with a system response of "Good bye!", node 123 received 66.6% of the incoming calls. This value can be displayed adjacent to node 123. Thus, when the statistics calculation program is invoked, the user may now view call percentage calculation values at each SCP (as shown in FIGS. 5 and 6).

In one embodiment, instead of presenting a visual display indicating that statistics have been calculated, the system can display actual calls statistics or call percentages at each SCP without the need for an intermediate "display" step. In some instances, the voice application developer would like to analyze a particular call flow path or SCP associated with a particular call. For example, in a complex call flow diagram, it is often useful to provide a visual path between nodes so that the developer can visually determine the exact path a call flow will take based on given prompts, and caller responses. This information is useful for streamlining or re-designing call flows to create a smoother and more efficient interactive voice dialog between callers and the interactive voice system. As discussed above, the user may simply click on a particular call flow path to obtain the call flow statistics for the selected call path.

Figure 5:
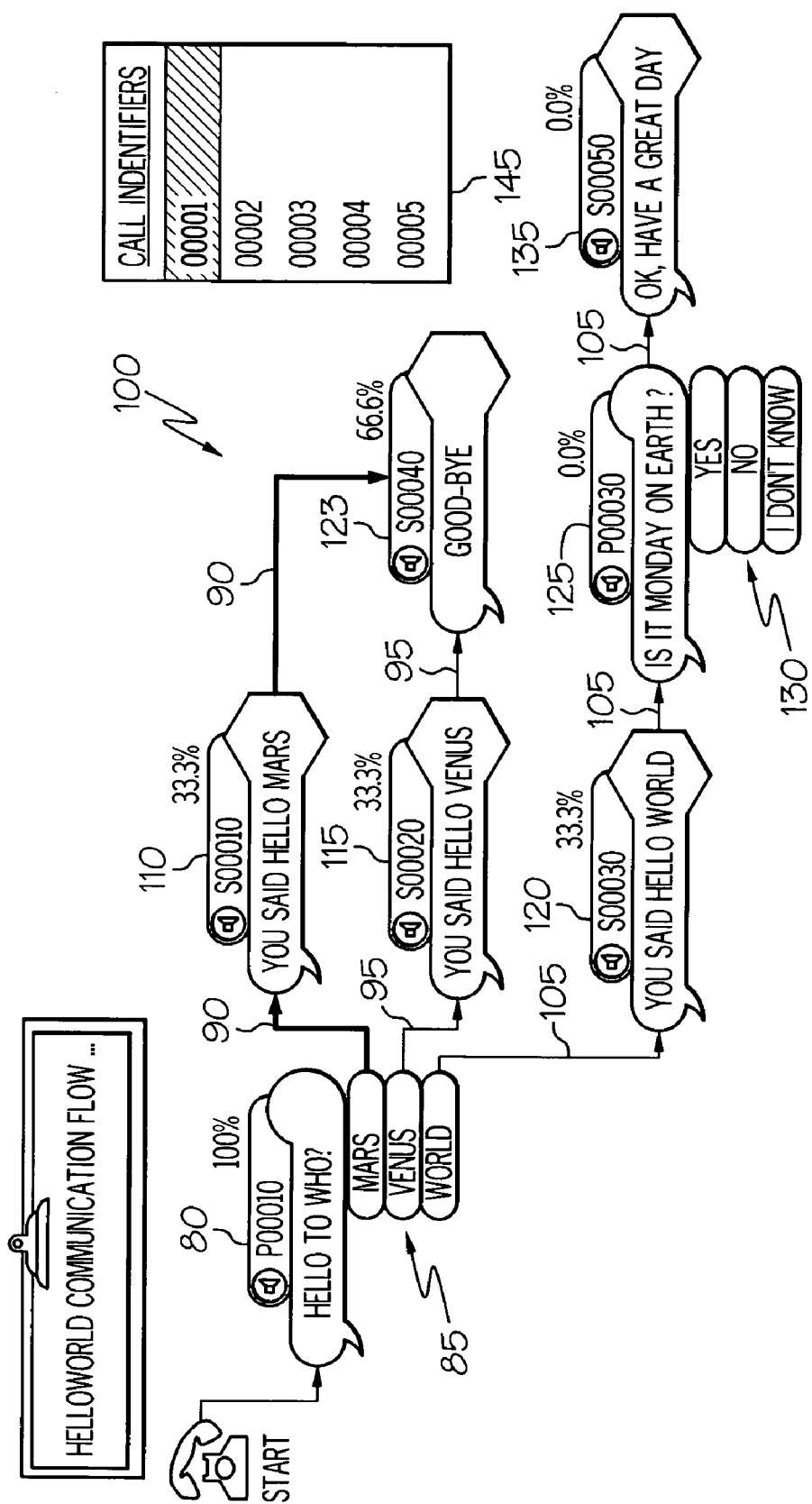
FIG. 5 is a schematic illustration of a call flow for a voice application including visible indication of a selected call flow path.
Figure 6:
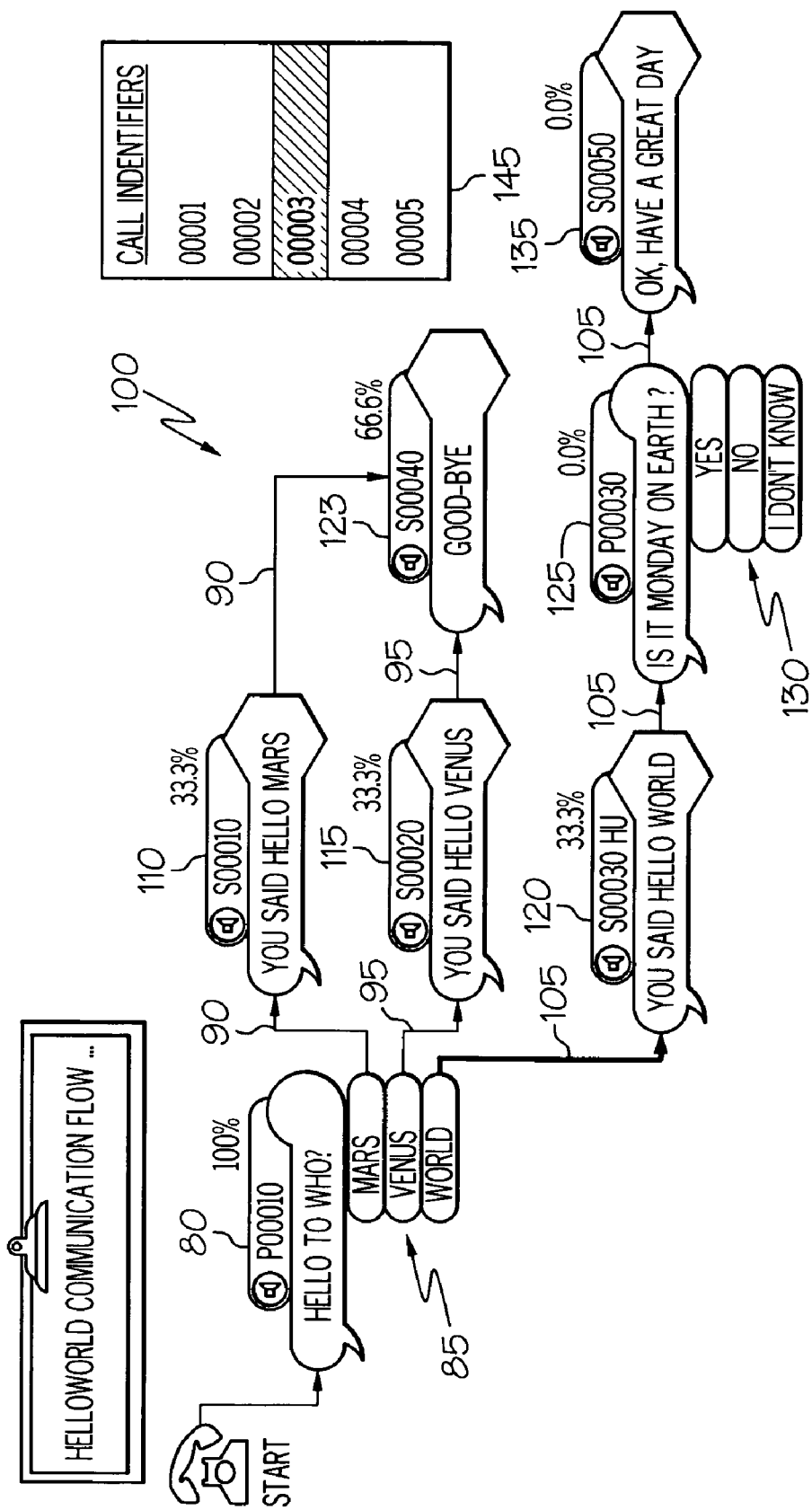
FIG. 6 is a schematic illustration of a call flow for a voice application including visible indication of an alternate call flow path.

In another embodiment of the invention, the developer takes an action, for example, right-clicking the computer mouse on the call flow canvas, and a menu 145 of several Call Identifiers ("CIs") are displayed, as shown in FIG. 5. Each CI corresponds to a particular call and call path in call flow 100. In this example, the user has selected CI 00001, which corresponds to a first call and call path 90. In response to the user's selection, both CI 00001 and call path 90 are highlighted. Thus, the user or developer is now presented with a graphic that accentuates a particular call path. In alternate embodiments, menu 145 could be displayed at all times or may be invoked by a different user action.

In another embodiment, one or more CIs are represented by a particular color, for example, red or green, depending upon the termination point of the call. For example, the color green may represent a call that was routed to its completion, while the color red may represent a call where the caller hung up prior to the successful routing of the call through its entire call path. Thus, in one example, if the user selects CI 00001, which is the CI associated with call number one ("Mars"), the call path associated with this call, i.e. call path 90 is highlighted in green. If the user selects a red CI, i.e. CI 00003, which corresponds with the third call ("World"), then call path 105 is highlighted in the same color red. This is illustrated in FIG. 6.

In the example shown in FIG. 6, the caller terminated the third call ("World") by hanging up, as indicated by "HU" at node 120. Because this call terminated prior to its completing its corresponding call path through node 135, call path 105 is highlighted in red, corresponding to the color of the associated CI. The information obtained from this particular embodiment may be used to perhaps change the prompts, grammars, system responses and other speech system features in order to avoid future call termination.

The present invention provides voice application developers with a configurable tool to enable them to utilize call flow statistics in the refinement and design of call flows. The tool gathers call flow statistics at various nodes in the call flow, notifies the developer when the statistics have been gathered, presents call flow statistics information at each node, and provides call flow identifiers that allow for easy visualization and identification of specific flow paths. Subsequent to the deployment of a voice application, call flow statistics are generated, gathered and stored on either a local or a remote server until requested. When requested, they appear on the call flow diagram associated with the voice application. Subsequent deployment of the voice application automatically updates the call flow statistics accordingly. Call flow developers need only invoke the statistics and view them on the call flow canvas. In such a way, the call flow can be analyzed and, if necessary, updated in order to provide a more efficient voice application.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for automatically generating call flow statistics for a voice application, the method comprising:
    loading a call flow builder application in memory of a computer system and executing the call flow builder application by a processor of the computer;
    rendering in a graphical user interface of the call flow builder application a call flow diagram of the voice application, the call flow diagram including one or more call flow paths;
    specifying one or more statistics collection points within the call flow diagram;
    deploying the voice application subsequent to specifying the statistics collection points within the call flow diagram; and
    upon deployment of the voice application, generating call flow statistics for the specified one or more statistics collection points.

2. The method of claim 1, further comprising providing a call flow statistics generation prompt.

3. The method of claim 1, wherein statistics collection points represent nodes on the call flow where at least one of the following occurs:
    providing a prompt to a caller;
    receiving a reply from the caller;
    attempting to match a grammar in response to the caller reply; and
    specifying a call path in response to the caller reply.

4. The method of claim 1, further comprising providing visual confirmation that call flow statistics have been collected for one or more statistics collection points.

5. The method of claim 1, wherein each call flow path is represented by a call flow identifier.

6. The method of claim 5, wherein upon receiving a selection of a call flow identifier, further comprising visually identifying the call flow path corresponding to the selected call flow identifier.

7. The method of claim 6, wherein the call flow path is identified by a color matching the color of the call flow identifier.

8. A system for automatically generating call flow statistics for a voice application, the system comprising:
    a display for providing a call flow diagram comprising a visual representation of a call flow of the voice application, the call flow including one or more call flow paths;
    a processor coupled to the display, the processor programmed to:
    specify one or more statistics collection points within the call flow;
    deploy the voice application subsequent to specifying the statistics collection points within the call flow diagram; and
    upon deployment of the voice application, generate call flow statistics for one or more statistics collection points.

9. The system of claim 8, wherein the display presents a call flow statistics generation prompt.

10. The system of claim 8, wherein statistics collection points represent nodes on the call flow where at least one of the following occurs:
    providing a prompt to a caller;
    receiving a reply from the caller;
    attempting to match a grammar in response to the caller reply; and
    specifying a call path in response to the caller reply.

11. The system of claim 8, wherein the display provides visual confirmation that call flow statistics have been collected for one or more statistics collection points.

12. The system of claim 8, wherein each call flow path is represented by a call flow identifier.

13. The system of claim 12, wherein upon receiving a selection of a call flow identifier, the display visually identifies the call flow path corresponding to the selected call flow path.

14. The system of claim 13, wherein the call flow path is identified by a color matching the color of the call flow identifier.

15. A computer program product comprising a computer usable storage medium storing thereon computer usable program code for automatically generating call flow statistics for a voice application, the computer program product including:
    computer usable program code for providing a call flow diagram of the voice application, the call flow diagram including one or more call flow paths;
    computer usable program code for specifying one or more statistics collection points within the call flow diagram;
    deploying the voice application subsequent to specifying the statistics collection points within the call flow diagram; and
    computer usable program code for, upon deployment of the voice application, generating call flow statistics for the specified one or more statistics collection points.

16. The computer program product of claim 15, wherein statistics collection points represent nodes on the call flow development application where at least one of the following occurs:
    providing a prompt to a caller;
    receiving a reply from the caller;
    attempting to match a grammar in response to the caller reply; and
    specifying a call path in response to the caller reply.

17. The computer program product of claim 15, further comprising computer usable program code for providing visual confirmation upon a display, the visual confirmation indicating that call flow statistics have been collected for one or more statistics collection points.

18. The computer program product of claim 15, wherein each call flow path is represented by a call flow identifier.

19. The computer program product of claim 18, wherein upon receiving a selection of a call flow identifier, further comprising computer usable program code for visually identifying the call flow path corresponding to the selected call flow path.

20. The computer program product of claim 19, wherein the call flow path is identified by a color matching the color of the call flow identifier.

* * * * *